Sept. 26, 1961 W. E. BOYD 3,001,842
DIFFERENTIAL BEARING ASSEMBLY
Filed Sept. 24, 1958
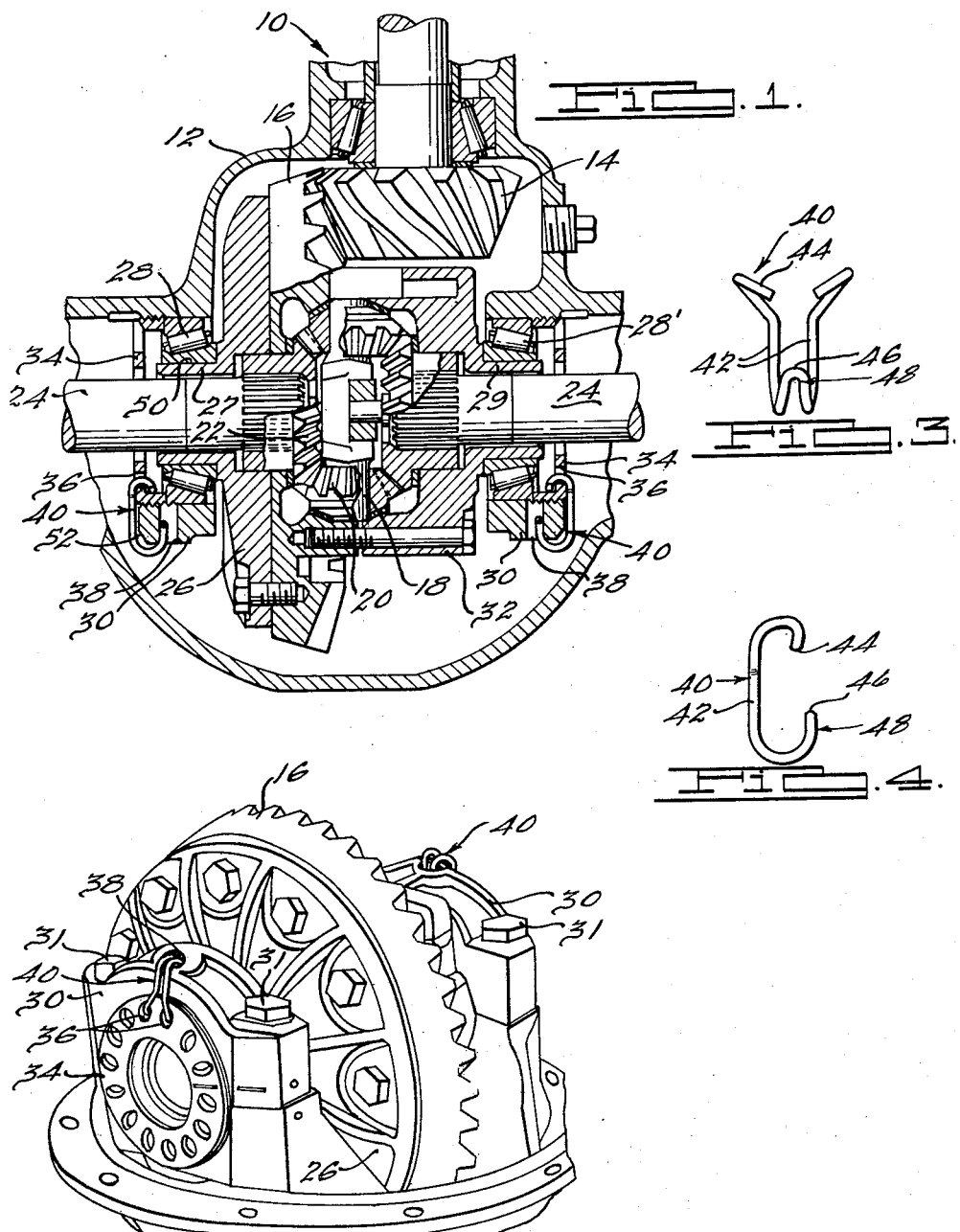
INVENTOR.
William E. Boyd.
BY
Harness and Harris
ATTORNEYS.

3,001,842
DIFFERENTIAL BEARING ASSEMBLY
William E. Boyd, Warren, Mich., assignor to Chrysler Corporation, Highland Park, Mich., a corporation of Delaware
Filed Sept. 24, 1958, Ser. No. 763,004
3 Claims. (308—236)

This invention relates to differential bearing assemblies and in particular to a novel structural combination for maintaining the differential bearings in their pre-selected, adjusted positions in the differential cover housing.

In differential bearing assemblies, the differential bearings are subjected to a great amount of thrust tending to force them out of the differential cover housing. This thrust is the result of the torque pressure transmitted from the drive pinion to the axle drive gear which gear is mounted directly on both of the differential bearings. Since this pressure becomes very high during certain operating conditions of high load, threaded bearing retaining rings are usually screwed into cooperating threaded sockets in the differential cover housing to abut the bearings and retain them in position. These rings are conventionally secured against rotation by means of locking dogs such as is shown in Patent No. 1,614,992 which dogs are secured to the differential cover housing by screws and have a projection inserted into apertures in the bearing retaining ring. While these dogs operate effectively, the manual operations necessary to install them in a differential bearing assembly presents the disadvantage of requiring the expenditure of considerable time and material. Moreover, several small parts such as screws, washers, and brackets are required, and in addition threaded apertures in the differential cover housing for receiving the screws must be provided by additional machining operations.

It is, therefore, a major object of this invention to provide a simple yet expedient structural combination which will eliminate the aforesaid disadvantages while functioning to retain the differential bearings in their proper position in the differential housing.

In the present invention a unitary snap spring means is provided having a mounting hook for hooking into a recess in the bearing mount portion of the differential cover housing and two retaining ring hooks for hooking into locking apertures in the bearing retaining ring. This spring means is sufficiently rigid when snapped into position to prevent relative rotation of the bearing retaining ring and the bearing mount.

A specific object of this invention is to provide a unitary snap spring means having hook portions for readily snapping into a cooperating aperture in a bearing cap and in a bearing retaining ring to lock said cap and said ring together to prevent relative rotation therebetween.

Further objects and advantages will become apparent from the following specification and drawings, in which:

FIGURE 1 represents a view partly in cross section of a differential assembly;

FIGURE 2 represents an isometric elevational view of the differential bearing assembly of FIGURE 1 rotated approximately 180° around the longitudinal axes of the axle;

FIGURE 3 represents a front elevational view of a unitary snap spring means; and FIGURE 4 represents a side elevational view of the spring means of FIGURE 3.

Referring to the drawings and in particular to FIGURE 1, a differential assembly 10 comprises a differential cover housing 12 mounting a drive pinion 14 that has an axle drive gear 16 meshed therewith. Differential casing cup 26 rotatably carries a differential pinion shaft 18 which shaft rotatably carries differential pinion gears 20 which mesh with differential side gears 22 carried by axle shafts 24. Axle drive gear 16 is integrally mounted on the differential casing cup 26 which cup is rotatably mounted in differential bearing 28 by means of the axially extending collar portion 27 on the casing cup 26. Bearing cap 30 cooperates with housing 12 to provide a 360° mounting surface for the bearing 28. Differential casing cap 32 secured to cup 26 is likewise rotatably mounted on the opposite side of differential housing 12 by identical type bearing 28'. A collar 29 on the cap 32 is journalled in the bearing 28' on the right side of the assembly. The specific structure of the differential assembly of FIGURES 1 and 2 of the conventional type as shown in Patent No. 2,588,670 forms no part of the present invention and further discussion thereof is deemed unnecessary.

Differential bearins 28 and 28' are secured in differential cover housing 12 by means of bearing retaining rings 34 which are threadedly received in the portions of the housing 12 and bearing caps 30 adjacent the bearing mounts. Bearing retaining rings 34 are provided with a plurality of locking apertures 36 and bearing caps 30 are provided with one or more locking recesses 38 depending on the number of snap rings 40 to be used.

These unitary snap springs 40 of resilient metal or plastic are provided with two substantially parallel arm portions 42 terminating at their ends in retaining ring hook 44. The center portion of each spring 40 is bent into a loop 46 forming a mount hook 48 as shown in FIGURES 3 and 4.

In assembling the differential bearing 28 with housing 12, cup 26, retaining ring 34 and spring 40, the bearing 28 is first frictionally forced over the surface portion 50 of cup collar 27 and is frictionally clamped in position in housing 12 by bearing cap 30 and bolts 31. Bearing retaining ring 34 is then threaded into the bearing supporting portions of the housing 12 and cap 30 so as to be in abutment with the outer race of bearing 28 and then spring 40 is snapped into locking position by inserting the retaining ring hooks 44 into two apertures 36 closest to recess 38 and thereafter forcing loop 46 across the beveled edge 52 of cap 30 until hook 44 snaps into recess 38. With the spring 40 in this position relative rotation of retaining ring 34 and the bearing mount cannot occur and bearing 28 will remain in its proper position in housing 12.

I claim:

1. In a differential assembly the combination of a bearing mount, a bearing mounted therein, a bearing retaining ring threaded into said mount and abutting said bearing, and a unitary snap spring means rigidly connecting said ring to said mount to prevent rotation of said ring relative to said mount, said snap spring means comprising a resilient wire formed at its longitudinal center portion into a loop to produce two substantially parallel arms, said loop and short lengths of each of said arms adjacent thereto being formed into a unitary mount hook, and the portion of each of said arms adjacent the free ends thereof being formed into a retaining ring hook, said mount and retaining ring hooks lying on the same side of a common plane through the longitudinal axis of both said arms and converging toward each other, and each of said retaining ring hooks being formed outwardly from a plane lying intermediate said substantially parallel arms and normal to said common plane.

2. In a differential assembly for automotive vehicles having a differential case mounted in a non-friction bearing and said bearing being mounted in a differential housing wherein said case is to be held substantially longitudinally stationary with respect to the housing, the combination of a bearing mount having a locking recess therein, a bearing contained in said mount, a bearing retaining ring threaded into said mount and abutting said bearing, locking apertures in said ring, and a snap spring having a mount hook projecting into said recess and retaining ring hooks projecting into said apertures, said spring rigidly connecting said retaining ring to said mount to prevent rotation of said ring relative to said mount, said spring comprising a resilient wire formed at its longitudinal center portion to produce two substantially parallel arms, said center portion and short lengths of each of said arms adjacent thereto being formed into said mount hook, and the portion of each of said arms adjacent the free ends thereof being formed into a retaining ring hook, said mount hook and said retaining ring hook lying on the same side of a common plane through the longitudinal axis of both said arms and converging toward each other.

3. In a differential assembly for automotive vehicles having a differential case mounted in a non-friction bearing and said bearing being mounted in a differential housing wherein said case is to be held substantially longitudinally stationary with respect to the housing, the combination of a bearing mount having a locking recess therein, a bearing contained in said mount, a bearing retaining ring threaded into said mount and abutting said bearing, locking apertures in said ring, and a snap spring having a mount hook projecting into said recess and retaining ring hooks projecting into said apertures, said spring rigidly connecting said retaining ring to said mount to prevent rotation of said ring relative to said mount, said spring comprising a resilient wire formed at its longitudinal center portion to produce two substantially parallel arms, said center portion and short lengths of each of said arms adjacent thereto being formed into said mount hook, and the portion of each of said arms adjacent the free ends thereof being formed into a retaining ring hook, said mount and retaining ring hooks lying on the same side of a common plane through the longitudinal axis of both said arms and converging toward each other, each of said retaining ring hooks being inclined outwardly from a plane lying intermediate said substantially parallel arms and normal to said common plane.

References Cited in the file of this patent

UNITED STATES PATENTS

| | | |
|---|---|---|
| 766,895 | Payne et al. | Aug. 9, 1904 |
| 1,663,003 | Curtis | Mar. 20, 1928 |
| 1,707,439 | Kivlan | Apr. 2, 1929 |
| 2,707,945 | Hughes | May 10, 1955 |
| 2,783,661 | Dryer | Mar. 5, 1957 |